Aug. 14, 1945.　　　E. M. SUTHERLAND ET AL　　　2,382,675
METHOD OF STORING AND FILLING BATTERIES
Filed Feb. 26, 1943

INVENTORS
EDWIN M. SUTHERLAND
CLARENCE H. ENDRESS
BY
Kwis, Hudson & Kent
ATTORNEYS Patented Aug. 14, 1945

2,382,675

UNITED STATES PATENT OFFICE 2,382,675

METHOD OF STORING AND FILLING BATTERIES

Edwin M. Sutherland, East Cleveland, and Clarence H. Endress, Cleveland Heights, Ohio, assignors to Willard Storage Battery Company, Cleveland, Ohio, a corporation of West Virginia Application February 26, 1943, Serial No. 477,198

4 Claims. (Cl. 136—162)

This invention relates to a method of packing primary cells or single or multiple cell secondary batteries and of filling such batteries later on when they are to be used.

In the Cahill et al. Patent No. 2,306,935, granted December 29, 1942, there is disclosed a type of secondary battery having a large number of very small filling openings in one wall thereof, the filling being accomplished by means of an eye-dropper, hypodermic syringe, or other hand-operated device by which the electrolyte may be injected by pressure. Obviously the filling of such batteries consumes a great deal of time.

An object of the invention is to provide a method of packing primary cells or dry-charged secondary batteries so that they will not deteriorate even though they are not used for a long period of time.

A further object of the invention is to provide an improved method of filling batteries, both primary and secondary. Batteries similar to those shown in the above mentioned patent may be effectively packed and filled by the method of this invention.

In accordance with the present invention, the batteries are packed in containers in which a vacuum is established and are maintained under vacuum until ready for use. Then the tube by which the vacuum was established is broken or opened, and, in the case of primary cells requiring no filling, the primary cells are removed. However, in the event the batteries are of the primary type requiring filling or are of the secondary type, the tube by which the vacuum was established is broken or opened in a chamber of electrolyte and the electrolyte entering the container completely fills the battery or batteries therein and they are ready for immediate use.

The invention may be further briefly summarized as consisting in certain improved steps of the method which will be described in the specification and set forth in the appended claims.

In the accompanying sheet of drawings wherein we have illustrated a preferred embodiment of the invention.

Figure 3:
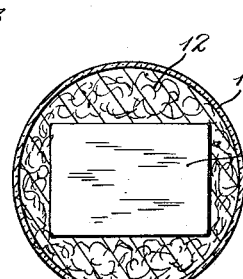
Fig. 3 is a sectional view along the line 3—3 of Fig. 1.
Figure 2:
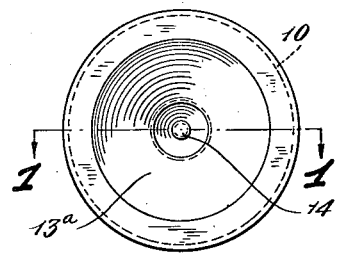
Fig. 2 is a view looking at the bottom end of the container as shown in Fig. 1.
Figure 1:
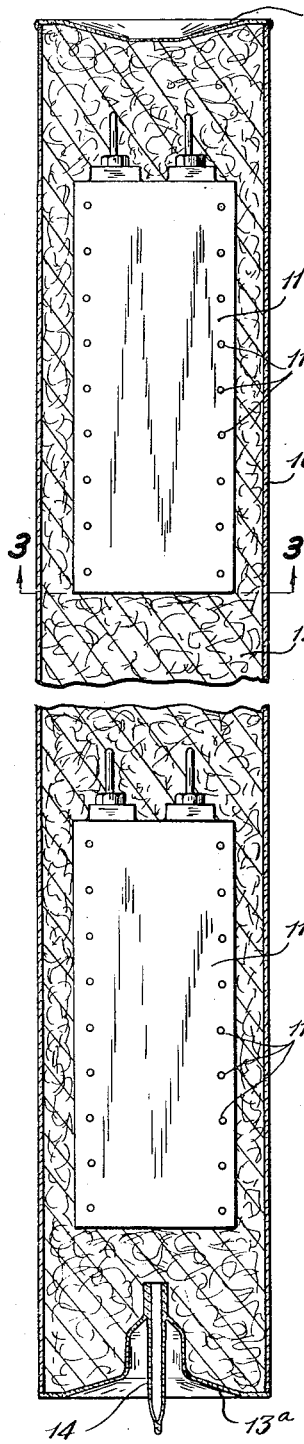
Fig. 1 is a sectional view showing a container in which batteries are packed in a vacuum, the section being taken along the line 1—1 of Fig. 2.
Figure 4:
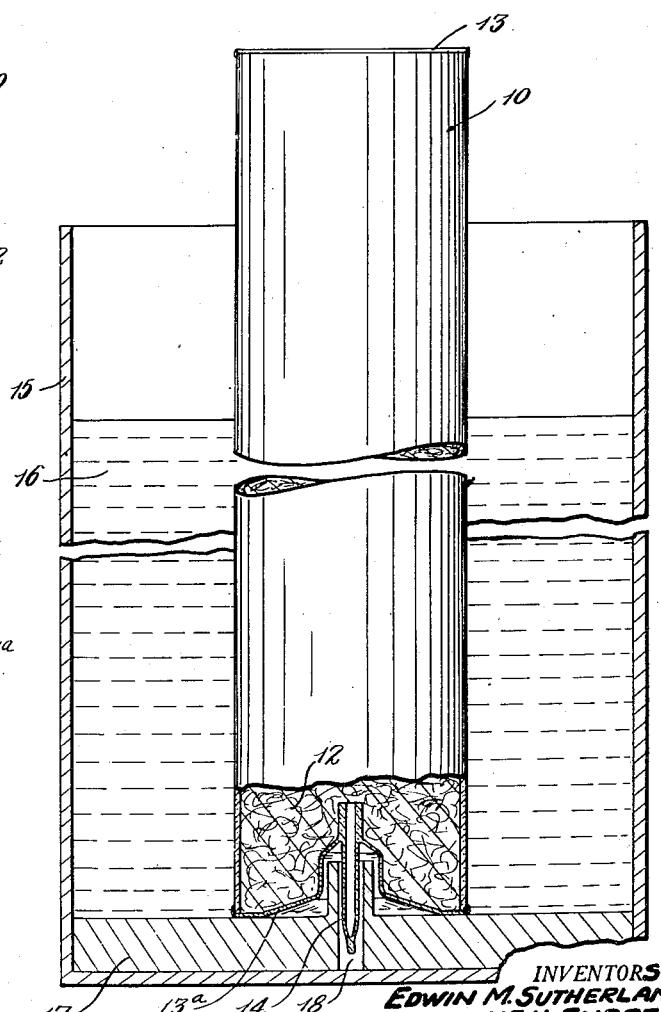
Fig. 4 is a view showing how the vacuum is broken under electrolyte resulting in the complete filling of the batteries.

Referring now to the drawing, 10 represents a container in which one or more dry-charged secondary batteries 11 are packed ready for storage or shipment. The batteries which are handled in this fashion are preferably small secondary batteries such as illustrated and described in Patent No. 2,306,935, and in this instance the battery comprises a case having a plurality of cells each of which contains charged positive and negative plates and a body of absorbent material disposed between the plates for the absorption and retention of electrolyte. These batteries are also provided with a large number of small filling and vent openings 11a extending through the battery case. A quantity of packing material 12, such as glass wool, holds the batteries against movement in the container 10. It will be understood, of course, that other packing materials, such as corrugated cardboard, wood, etc., may be used.

The container 10 may be formed of various acid-resistant materials capable of holding a vacuum, including glass, suitable acid-resistant plastics, as for example polystyrene or the plastic known by the trade name "Saran" (vinylidene chloride), or any other suitable material. The container 10 is shown in the drawing as of tubular or cylindrical form, but it may be a jar or container of any other shape. The container 10 has its ends closed by closure members 13 and 13a which are preferably welded instead of cemented to the ends of the container. If the container is glass, the packing material employed is usually glass wool or other material which will act as an insulator against the heat from the welding operation. Both ends of the container are preferably though not necessarily depressed and are preferably formed of thinner material than the body of the container so as to facilitate breakage for the subsequent removal of the batteries. The end member 13a has a tubular extension 14 through which a vacuum may be established in the container 10 by a suitable vacuum pump and which is sealed by heat when all the air possible has been exhausted from the container.

Obviously sealing the batteries in a vacuum permits a long period of storage of the batteries or shipment to far distant places without deterioration. In other words, it excludes objectionable humidity from primary cells until they are ready for use, and, in the case of secondary batteries, it prevents oxidation of the plates, particularly the negative plates. When the batteries are filled in the manner to be described, they are ready for immediate use.

When it is desired to use the battery or batteries, the seal of the container 10 is broken under electrolyte. This can be conveniently accomplished in a chamber 15 containing a quantity of electrolyte 16, the chamber 15 preferably having at the bottom thereof a rack 17 having a series of holes 18 of various sizes therein. The tubular extension 14 of the container 10 is broken by twisting it in one of the rack openings. This breaks the seal and results in the flow of the electrolyte into the container 10, completely filling the batteries therein and thus saving the immense amount of time which would be necessary if the electrolyte were supplied in the usual manner by an eye-dropper or a hypodermic syringe. The batteries can be conveniently removed from the container 10 by breaking one or both ends of the container with a suitable tool and pushing the batteries and the insulating or packing material out of the container.

It will be understood that the container 10 may be constructed to receive a single battery or several batteries, but in this instance a container receiving several batteries is shown. Likewise it will be understood that the term "battery" or "batteries" as used herein includes primary cells and single or multiple cell secondary batteries.

While we have shown the preferred embodiment of the invention, we do not desire to be confined to the precise details shown and described but aim in our claims to cover all modifications which do not involve a departure from the spirit and the scope of the invention.

Having thus described our invention, we claim:

1. The method for preventing the deterioration of one or more batteries until use and providing rapid filling thereof when the battery or batteries are to be used, each of which batteries includes a battery case provided with one or more open filling openings, said method comprising placing the battery or batteries in a container, creating a vacuum in said container, sealing the container after the vacuum is established, and when the battery or batteries are to be used breaking the seal of the container under electrolyte whereby the electrolyte passes into said container at the point where the seal of the container is broken and enters the battery case or cases through said filling opening or openings, and then removing the battery or batteries from the container.

2. The method for preventing the deterioration of one or more batteries until use and providing rapid filling thereof when the battery or batteries are to be used, each of which batteries includes a battery case provided with one or more open filler openings, said method comprising placing the battery or batteries in a container, creating a vacuum in said container, sealing the container after the vacuum is established, and when the battery or batteries are to be used breaking the seal of the container while in communication with a supply of electrolyte at the point where the seal is broken whereby the electrolyte passes into said container and enters the battery case or cases through said filler opening or openings, and then removing the battery or batteries from the container.

3. The method for preventing the deterioration of one or more batteries until use and providing rapid filling thereof when the battery or batteries are to be used, each of which batteries includes a battery case provided with one or more open filler openings, said method comprising placing the battery or batteries in a container, creating a vacuum in said container, sealing the container after the vacuum is established, and when the battery or batteries are to be used lowering the container in a chamber containing electrolyte and breaking the seal at the lower end of the container whereby the electrolyte passes into said container at the bottom where the seal of the container is broken and enters the battery case or cases through said filler opening or openings, and then removing the battery or batteries from the container.

4. The method of preventing the deterioration of one or more batteries until use and providing rapid filling thereof when the battery or batteries are to be used, each of which batteries includes a case provided with one or more filler openings, said method including placing the battery or batteries in a container having a relatively frangible portion, creating a vacuum in the container, sealing the container after the vacuum is established and when the battery or batteries are to be used, lowering the container in a chamber containing electrolyte and breaking the seal at the relatively frangible portion, whereby the electrlyte passes into the container at the point where the seal is broken and enters the case of each battery through said filler opening or openings, and then removing the battery or batteries from the container.

EDWIN M. SUTHERLAND.
CLARENCE H. ENDRESS.